Nov. 26, 1963 N. S. ZIMBEL 3,112,413

SYNCHRONOUS LOGIC CIRCUIT

Filed Aug. 12, 1960

INVENTOR.
NORMAN S. ZIMBEL

BY Fred Jacob

ATTORNEY

United States Patent Office 3,112,413

Patented Nov. 26, 1963

3,112,413
SYNCHRONOUS LOGIC CIRCUIT

Norman S. Zimbel, Newton Center, Mass., assignor to Minneapolis-Honeywell Regulator Company, Minneapolis, Minn., a corporation of Delaware Filed Aug. 12, 1960, Ser. No. 49,289
13 Claims. (Cl. 307—88.5)

The present invention relates in general to a new and improved logical circuit of the kind employed for digital computation and in particular to a synchronous logical circuit whose operation is controlled by timing pulses.

Logical circuits are employed to implement certain operations which are carried out by a computer. The information in a digital computer may move under the control of a clock which provides periodically recurring clock pulses to which all computer operations are referenced. The mathematical system which has most frequently been employed to carry out digital computations is the binary numerical system, due to the facility with which electrical circuitry can be adapted to such use. Many electrical circuits and components are essentially bistable in nature, i.e. they are capable of residing in one of two stable conditions which are readily equated with the corresponding mathematical binary functions.

An example of such a bistable component is a flip-flop circuit wherein a first one of two active elements resides in a saturated state, while the second element is cut off. The signal thus obtained at the output of the flip-flop may be changed upon the selective energization of the circuit to cut off the first element and saturate the second. Since, by its very nature, a flip-flop of this type is symmetrical in construction, it is most frequently found in double-ended form, i.e. with two signal inputs. Thus, in a flip-flop circuit which employs a pair of transistors, one input signal is coupled to the base of each transistor, and both signals are required to set the flip-flop to its first stable state and to reset it subsequently to its other stable state.

Although a symmetrical construction represents the most direct design approach, there are many applications when its disadvantages outweigh this consideration. For example, the requirement for two input signals places a demand on the system logic which may be beyond the ability of the system to satisfy at modest expense since such a circuit requires nearly twice the amount of input circuitry of a single-ended flip-flop which is actuated by a single input signal. A further disadvantage of a double-ended bistable storage device resides in the inherently lessened reliability of such a circuit due to the doubling of the input circuitry and due to the requirement for properly timing two input signals instead of one. These problems are further compounded where the computer logic requires the storage circuit to assume one of its stable states periodically, e.g. where it is unconditionally reset at clock pulse intervals.

The information in a binary digital computer is generally carried in the form of signals which are bilevel in nature, i.e. signals which have one or the other of two possible voltage (or current) levels to represent a binary zero or one. Where the computer logic requires the coincidence of a number of input signals to effect a certain action, such as changing the state of a bistable storage device, a conventional "and" gate is used to receive the input signals. Similarly, where any one or several of a number of input signals may initiate the action, the signals are gated together by means of a conventional buffer arrangement.

The gating of these gated signals to a bistable storage device, such as a single-ended flip-flop circuit which is to be unconditionally reset to one of its stable states at clock time intervals, has heretofore been attended by a number of difficulties in prior art devices. The presence of the flip-flop circuit produces a loading effect on the gating structure, particularly where the power to set and reset the flip-flop is drawn from the gates. The efficiency of the gating structure is decreased accordingly and the available signal strength at the output of the gating structure may be inadequate to produce flip-flop switching which is sufficiently rapid to satisfy the requirements of the computer as determined by the computer clock.

Accordingly, it is a primary object of this invention to provide a logical circuit which overcomes the foregoing disadvantages.

It is another object of this invention to provide a single-ended logical circuit wherein input signals are efficiently gated to a bistable storage circuit which is unconditionally reset at periodic intervals.

It is a further object of this invention to provide a single-ended, synchronous logical circuit in a computer system in which input signals are efficiently gated to a bistable storage circuit in synchronism with the system clock pulses and wherein the bistable storage circuit is unconditionally reset at clock pulse intervals.

It is an additional object of this invention to provide a single-ended, synchronous logical circuit in a computer in which the gating of input signals to a bistable storage circuit proceeds under the control of the system clock which also serves as a time reference and source of power for certain operations of the storage circuit.

In the logical circuit which forms the subject matter of this application, the input signals are applied to a gating structure which consists of one or more gates buffered together, each gate having a plurality of input terminals. The single output of the gating structure is coupled to the input of a single-ended transistor flip-flop circuit by means of a special coupling circuit which comprises a pair of oppositely poled, unidirectional paths connected in parallel and means for applying bipolar clock pulses to one junction point of the parallel combination. Since the operation of the circuit is not dependent on the slope of the clock pulse wave form, sinusoidal clock pulses may be employed.

The various novel features which characterize the invention are pointed out with particularity in the claims annexed to and forming a part of this specification. For a better understanding of the invention, its advantages and specific objects thereof, reference should be had to the following detailed description and the accompanying drawings in which:

Figures 1, 2:
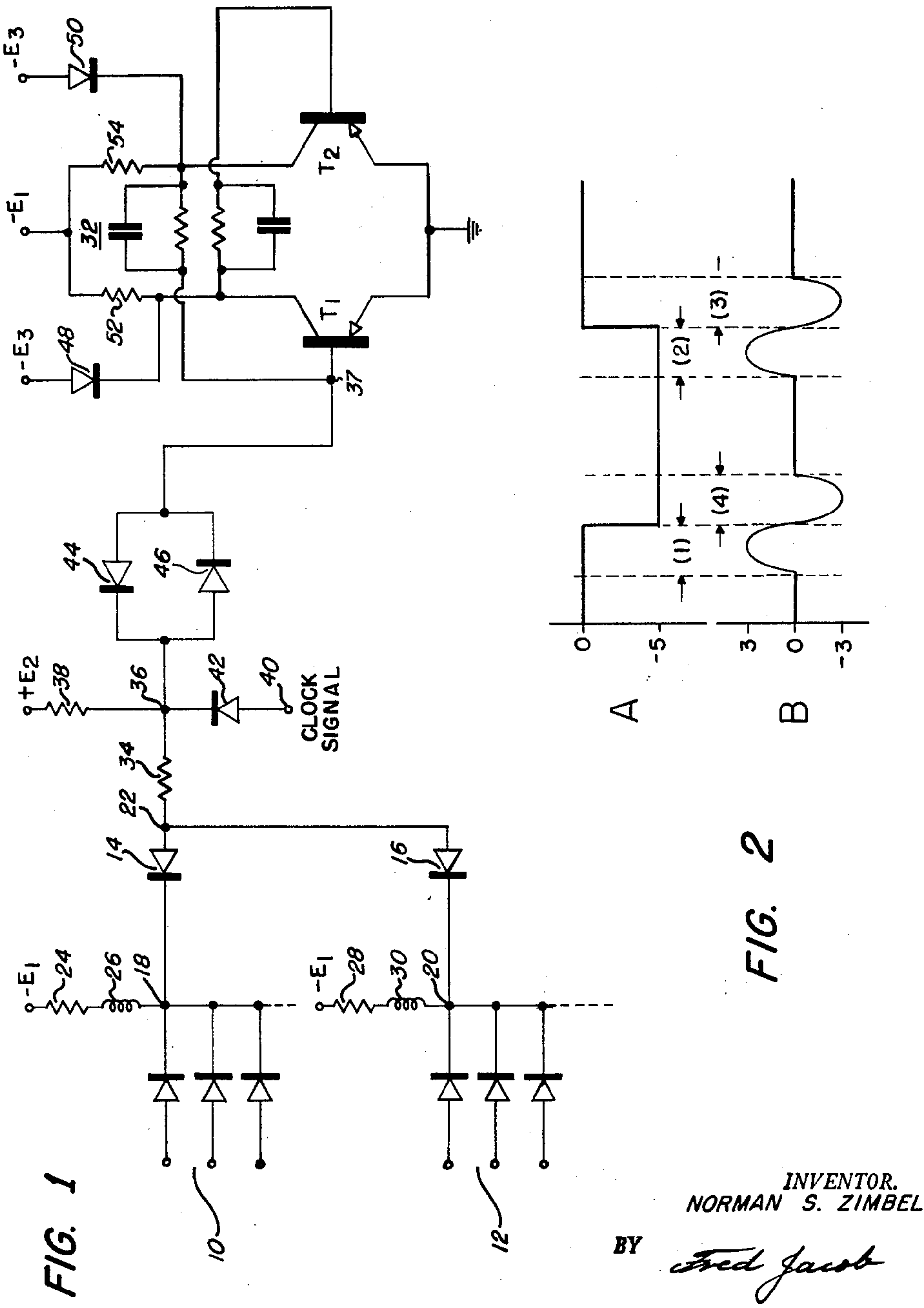
FIGURE 1 is a schematic diagram of a preferred embodiment of the invention.
FIGURE 2 illustrates the wave forms of the applied signals.

With reference now to the drawings, FIGURE 1 shows a gating structure which consists of a pair of gates 10 and 12 buffered together by means of diodes 14 and 16 respectively. Each of the gates has a plurality of input terminals which are individually coupled to a pair of junction points 18 and 20 respectively by means of input diodes which are poled in opposition to the diodes 14 and 16 respectively. The broken line in the drawing indicates that the number of input terminals coupled to each of the junction points is not limited to that shown in the drawing. Similarly, further gates may be buffered to the junction point 22 which forms the output of the gating structure.

A negative D.C. potential $-E_1$ is coupled to the junction point 18 by means of resistor 24 and inductance 26. The negative D.C. potential $-E_1$ is further coupled to the junction point 20 by means of a resistor 28 and an inductance 30. The coupling circuit which connects the output 22 of the gating structure to a single-ended flip-flop circuit 32 includes a resistor 34 connected between the output 22 and a junction point 36. A positive D.C. potential $+E_2$ is applied to the junction point 36 by means of a resistor 38. A terminal 40 is adapted to receive a clock signal which is applied to the junction point 36 by means of a diode 42 poled to pass current in the direction of the junction point 36. The junction point 36 is coupled to the input 37 of the single-ended flip-flop 32 by means of a pair of diodes 44 and 46 which are connected in parallel and which are poled to conduct current in opposite directions.

The flip-flop 32 consists of a pair of transistors $T_1$ and $T_2$ whose emitters are jointly connected to ground. The base of the transistor $T_1$ constitutes the input of the flip-flop and is further coupled, by means of a parallel resistor-condenser combination, to the collector of the transistor $T_2$. The base of the latter transistor is similarly connected by means of a parallel resistor-condenser combination to the collector of the transistor $T_1$. A pair of diodes 48 and 50 are connected between the collectors of the transistors $T_1$ and $T_2$ respectively, and a source of negative D.C. potential $-E_3$. The diodes 48 and 50 are poled to conduct current in the direction of the transistor collectors. The latter are further coupled, by means of resistors 52 and 54 respectively, to the aforementioned source $-E_1$ of negative D.C. potential.

As an example, but without limiting the invention thereto, $-E_1$ may be $-20$ volts, $+E_2$ may be 20 volts and $-E_3$ may be $-5$ volts for the circuit shown.

The operation of the circuit of FIGURE 1 will be explained with the aid of the wave forms illustrated in FIGURE 2. Bilevel input signals whose amplitude is either zero or equal to $-E_3$, are applied to the input terminals of the "and" gates 10 and 12. These input signals are shown in FIGURE 2A. The operation of each "and" gate is such that negative signals must be applied simultaneously to all the input terminals thereof before an output pulse is obtained. A gate is considered to be "on" when a negative voltage level $-E_3$, is applied to each input thereof. Under any other conditions, the gate is considered to be "off." In order for an output signal to appear at the output 22 of the gating structure, at least one "and" gate must be "on."

The clock pulses applied to the terminal 40 are seen to be bipolar in nature from FIGURE 2B, which shows one form of a clock signal wherein sinusoidally varying pulses are intermittently applied.

In essence, there are four operating conditions which must be considered. These are illustrated in FIGURE 2 and are listed below:

(1) Gate off—positive-going portion of clock pulses
(2) Gate on—positive-going portion of clock pulses
(3) Gate off—negative-going portion of clock pulses
(4) Gate on—negative-going portion of clock pulses.

In condition (1), it is assumed that both of the gates 10 and 12 are "off," i.e. the input signal applied to at least one input terminal of each gate is at zero or ground potential. Accordingly, at least one input diode of each gate conducts and causes the junction point 18 to be clamped to ground. The positive-going portion of the clock pulses causes current to flow through the path defined by the diode 42, resistor 34, diode 14, inductance 26 and resistor 24. The voltage which appears at the junction point 36, reflects the level of the applied clock signal as long as the diode 42 conducts. This voltage level is sufficient to overcome the threshold of the diode 46.

A positive signal is thus applied to the base of the transistor $T_1$ which compels a cut-off condition of the latter. The collector of the transistor $T_1$ then assumes the negative potential $-E_1$ which is coupled to it by way of the resistor 52. Due to the regenerative action of the flip-flop 32, the potential on the collector $T_1$ is coupled to the base of the transistor $T_2$ by way of the linking parallel resistor-condenser combination. This action causes the transistor $T_2$ to conduct and quickly reach its saturation point. It thus appears that the application of a positive signal to the base of the transistor $T_1$ produces cut-off of the latter, and saturation of the transistor $T_2$. The flip-flop 32 is now in one of its two stable states, which is termed the reset state herein. It will be understood that the application of a positive signal to the base of the transistor $T_1$ when the flip-flop 32 is already in the reset state will produce no further effect.

Although the operating condition (1) has been described above with reference to gate 10 only, where the input conditions are the same for both, the action taking place in the gate 12 will be identical to that of gate 10. Accordingly, it will be sufficient hereinbelow to discuss the operation of the circuit with reference to gate 10 only.

As shown in FIGURE 2, a negative input signal is applied to the input terminals of gate 10. The voltage level $-E_3$ of the input signal, being more negative than the voltage at the junction point 18, causes the input diodes to become non-conductive. The potential of the junction point 18 tends to approach the $-E_1$ level, but is clamped to ground by the ground level portion of the clock signal prior to the arrival of the positive sinusoidal portion. In the operating condition (2), the positive-going portion of the clock signal causes the diode 42 to conduct, and a voltage is developed through the circuit which consists of the diode 42, resistor 34, diode 14, inductance 26 and resistor 24. With the value of resistor 34 chosen to be relatively small and the impedance value of the inductance 26 relatively large, the junction point 18 will rise from approximately ground potential in synchronism with the clock pulse. The positive voltage which appears at the junction point 36 is sufficient to exceed the threshold of the diode 46, and a positive potential is applied to the base of the transistor $T_1$. As in the case of operating condition (1), the application of this positive pulse compels the reset state of the flip-flop circuit 32.

As seen from FIGURE 2, during the operating condition (3) at least one of the input terminals of the gate 10 receives an input signal whose voltage level is at ground. The connected input diode conducts and clamps the junction point 18 to ground. The negative portion of the clock signal simultaneously biases the diode 42 to cut-off. The circuit portion which determines the potential of the junction point 36 thus consists of the resistor 38, resistor 34, and the diode 14 which is connected to the grounded junction point 18. The value of the resistor 38 is chosen to be large compared to the relatively small resistor 34 so that the potential of the junction point 36 is only slightly above ground and is insufficient to exceed the threshold of the diode 46. Accordingly, no change in the state of the flip-flop 32 results.

With the gate 10 "on" during the condition (4), the negative input signal supplied to each of the input terminals of gate 10 causes the input diodes to be cut off. The absence of a ground clamp now permits the junction point 18 to swing slightly negative. As a result, the application of the negative-going clock signal does not immediately bias the diode 42 to cut-off, and a current path is temporarily established which consists of the diode 42, resistor 34, diode 14, inductance 26 and resistor 24.

Prior to cut-off of the diode 42, the negative-going excursion of the clock signal causes the potential of the junction point 36 to swing negative and to apply a negative potential to the connected terminal of the diode 44. Due to the reset state of the flip-flop 32 as the result of the previously occurring positive portion of the clock signal, the transistor $T_1$ is in its cut-off state and the potential on its base, which is applied to the other terminal of the diode 44, is close to zero. The junction point 36 follows the negative-going voltage swing of the clock signal for a sufficiently long time interval to apply a potential to the other terminal of the diode 44 such that the diode threshold is exceeded. Conduction of the diode 44 then causes the negative potential on the junction point 36 to be applied to the base of the transisor $T_1$. This action renders the previously cut-off transistor conductive, the regenerative action of the flip-flop circuit causing it to saturate while the transistor $T_2$ is cut off. The flip-flop circuit 32 is now in the other one of its two stable states, which is termed the set state herein.

From the foregoing explanation, it will be seen that the flip-flop circuit is reset by the positive portion of the clock signal regardless of the nature of the applied input signals. Stated differently, the flip-flop device is unconditionally reset in the operation of the logical circuit. Setting of the flip-flop circuit, however, by the negative portion of the clock signal occurs conditionally, i.e. only when the gating structure is "on." If the gating structure is off, the unconditional reset is not followed by a setting action and the flip-flop circuit remains reset.

This logic is performed by a circuit which permits a gating structure with a single output to control a single-ended bistable storage device. The design of the gating structure is not limited by loading considerations since the power for switching the flip-flop circuit, which is supplied by the gate output signal in conventional circuits, is derived from the system clock. Due to the fact that the gating structure operates at maximum efficiency, rapid flip-flop switching time is assured. The operation is synchronized by the clock pulses which control the operation of the computer system of which the logical circuit is a part.

The flexibility of the invention is further enhanced by its lack of dependence on clock pulses having square wave shapes. It will be understood that the latter may be satisfactorily used as clock signals if they are available. A sinusoidal clock signal, however, is preferable since it obviates the requirement for controlling the pulse width and therefore results in a more reliable operation. The invention will also operate with a continuous sine wave clock signal.

The invention is not limited to the preferred embodiment which is illustrated and described. Changes of the applied voltage amplitudes, substitution of equivalent components, polarity changes, etc. will be readily apparent from the foregoing disclosure of the invention. Numerous modifications, changes and equivalents will now occur to those skilled in the art, all of which fall within the true spirit and scope contemplated by the invention.

What is claimed is:

1. A logical circuit comprising a gating structure having a plurality of input terminals, means for applying bilevel input signals to said input terminals, a bistable storage device having a single signal input, means including a pair of oppositely poled unidirectional paths for coupling said gating structure to said single input, and unilaterally conductive means for applying a clock signal to said coupling means; whereby said storage device is unconditionally reset to one of its stable states upon the occurrence of a predetermined portion of said clock signal, but is set to its other stable state only in the presence of input signals having a predetermined voltage level.

2. A logical circuit comprising gating means, means for applying input signals to said gating means, a bistable storage device having a single signal input, a coupling circuit connected between the output of said gating means and said single input, said coupling circuit including a pair of oppositely poled unilaterally conductive paths connected in parallel, and unilaterally conductive means for applying a clock signal to one junction point of said parallel-connected paths; whereby said clock signal unconditionally resets said storage device to one of its stable states but sets it to its other stable state only in accordance wih the input signals applied to said gate.

3. A logical circuit comprising a gating structure having a plurality of input terminals, means for applying bilevel input signals to said input terminals, a bistable storage device having a single signal input, means for coupling said gating structure to said single input, and means for applying a bipolar clock signal to said coupling means; whereby said storage device is unconditionally reset to one of its stable states upon the occurrence of a predetermined portion of said clock signal, but is set to its other stable state only in the presence of input signals having a predetermined voltage level.

4. A logical circuit comprising means for receiving an input signal whose voltage level is either negative or at ground, a bistable storage device having a single signal input, means for coupling said input signal receiving means to the input of said storage device, and means for applying a bipolar clock signal to said coupling means, said storage device being unconditionally reset to one of its stable states by the positive portion of said clock signal, but being set to its other stable state by the negative portion of the clock signal only in the presence of an input signal having a negative voltage level.

5. A logical circuit comprising gating means, means for applying input signals to said gating means, a bistable storage device having a single signal input, means for coupling said gating means to said single input, and means for applying a bipolar clock signal to said coupling means; whereby said clock signal unconditionally resets said storage device to one of its stable states but sets it to its other stable state only in accordance with the input signals applied to said gating means.

6. A logical circuit comprising gating means, means for applying bilevel input signals to said gating means, a single-sided bistable storage device, means for coupling said gating means to the input of said storage device, and means for applying a bipolar clock signal to said coupling means; whereby said storage device is unconditionally reset to a first stable state by said clock signal having one polarity, but is set to its second stable state by an oppositely poled clock signal only in the presence of an input signal having a predetermined voltage level.

7. A logical circuit comprising gating means, means for applying input signals to said gating means, a bistable storage device having a single signal input, means including a pair of oppositely poled unidirectional paths for coupling said gating means to said single input, and means for applying a clock signal to said coupling means; whereby said clock signal unconditional resets said storage device to one of its stable states but sets it to its other stable state only in accordance with the input signals applied to said gating means.

8. A logical circuit comprising at least one "and" gate having a plurality of input terminals, means for applying bilevel input signals to said input terminals, a bistable storage device having a single signal input, a coupling circuit connected between the output of said gate and said single input, said coupling circuit including a pair of oppositely poled unilaterally conductive paths connected in parallel, and unilaterally conductive means for applying a clock signal to said coupling circuit; whereby said storage device is unconditionally reset to one of its stable states upon the occurrence of a predetermined portion of said clock signal, but is set to its other stable state only in the presence of input signals on all of said input terminals having a predetermined voltage level.

9. A logical circuit comprising at least one "and" gate having a plurality of input terminals, means for applying bilevel input signals to said input terminals, a bistable storage device having a single signal input, a coupling connected between the output of said gate and said single input, said coupling circuit including a pair of oppositely poled unilaterally conductive paths connected in parallel, and unilaterally conductive means for applying a clock signal to said coupling circuit; whereby said storage device is unconditionally reset to one of its stable states upon the occurrence of a predetermined portion of said clock signal, but is set to its other stable state only in the presence of input signals on all of said input terminals having a predetermined voltage level.

10. The apparatus of claim 9 wherein said clock signal varies sinusoidally with time.

11. A synchronous logical circuit comprising a gating structure with at least one "and" gate having a plurality of input terminals, means for applying bilevel input signals to said input terminals, said "and" gate including a diode connected between each of said input terminals and a first junction point poled to conduct current in the direction of the latter, a series-connected resistor-inductance combination for coupling a first negative potential to said first junction point, a diode having one terminal connected to said first junction point and poled to conduct in the direction of the latter, the other terminal of said last-recited diode constituting the output of said gating structure, a coupling circuit including a second junction point resistively coupled to said gating structure output, means for resistively coupling a positive potential to said second junction point, a diode having one terminal connected to said second junction point and poled to conduct in the direction of the latter, means for applying a bipolar sinusoidally varying clock signal to the other terminal of said last-recited diode, and a bistable flip-flop circuit having a single input, said coupling circuit further including an oppositely poled diode pair connected between said second junction point and said single input.

12. A synchronous logical circuit comprising a gating structure with at least one "and" gate having a plurality of input terminals, means for applying bilevel input signals to said input terminals, said "and" gate including a diode connected between each of said input terminals and a first junction point poled to conduct current in the direction of the latter, a series-connected resistor-inducance combination for coupling a first negative potential to said first junction point, a diode having one terminal connected to said first junction point and poled to conduct in the direction of the latter, the other terminal of said last-recited diode constituting the output of said gating structure, a coupling circuit including a second junction point resistively coupled to said gating structure output, means for resistively coupling a positive potential to said second junction point, a diode having one terminal connected to said second junction point and poled to conduct in the direction of the latter, means for applying a bipolar sinusoidally varying clock signal to the other terminal of said last-recited diode, a bistable circuit including a pair of transistors, said coupling circuit further including an oppositely poled diode pair connected between said second junction point and the base of one of said transistors, the base of each of said transistors being coupled to the collector of the other transistor by a parallel resistor-condenser combination, the emitters of said transistors being connected to ground, means for resistively coupling a second negative potential to each of said collectors, and means for unilaterally coupling a third negative potential to each of said collectors.

13. The apparatus of claim 12 wherein said gating structure comprises a plurality of "and" gates buffered to the output thereof, the input terminals of each of said "and" gates being adapted to receive bilevel input signals.

References Cited in the file of this patent

UNITED STATES PATENTS 2,965,767 Wanlass ---------------- Dec. 20, 1960